United States Patent [19]

Adrain et al.

[11] Patent Number: 5,200,900
[45] Date of Patent: Apr. 6, 1993

[54] AUTOMOTIVE MULTIPLE MEMORY SELECTOR APPARATUS WITH HUMAN INTERACTIVE CONTROL

[75] Inventors: John B. Adrain, 723 Ocean View Dr., Port Hueneme, Calif. 93041; John V. Colln, Port Hueneme, Calif.

[73] Assignee: John B. Adrain, Port Hueneme, Calif.

[21] Appl. No.: 830,552

[22] Filed: Jan. 30, 1992

Related U.S. Application Data

[63] Continuation of Ser. No. 579,072, Sep. 6, 1990, abandoned.

[51] Int. Cl.⁵ ............................................. G06F 15/20
[52] U.S. Cl. ........................ 364/431.12; 364/431.04; 123/486
[58] Field of Search ......... 364/431.01, 431.03–431.12, 364/424.01, 424.05, 426.01, 222.4, 925–925.3; 123/399, 417, 480, 486

[56] References Cited

U.S. PATENT DOCUMENTS

| | | | |
|---|---|---|---|
| 4,084,240 | 4/1978 | Lappington | 364/431.04 X |
| 4,277,829 | 7/1981 | Tokuda | 364/431.05 |
| 4,291,237 | 9/1981 | Kitano | 307/10.3 |
| 4,470,396 | 9/1984 | Hasumi et al. | 123/399 X |
| 4,502,324 | 3/1985 | Marino et al. | 364/431.12 X |
| 4,556,943 | 12/1985 | Pauwels et al. | 364/431.12 |
| 4,671,235 | 6/1987 | Hosaka | 123/399 X |
| 4,677,558 | 6/1987 | Böhmler et al. | 364/431.04 |
| 4,730,256 | 3/1988 | Niimi et al. | 364/431.12 |
| 4,735,181 | 4/1988 | Kaneko et al. | 123/399 X |
| 4,751,633 | 6/1988 | Henn et al. | 364/431.12 X |
| 4,875,454 | 10/1989 | Okimoto et al. | 123/559.3 |
| 4,893,600 | 1/1990 | Holmes | 123/419 |
| 4,908,792 | 3/1990 | Przybyla et al. | 364/431.12 X |
| 4,991,683 | 2/1991 | Garretto et al. | 307/10.2 X |
| 4,996,965 | 3/1991 | Orari et al. | 123/492 |
| 5,031,100 | 7/1991 | Takahashi | 364/424.1 |
| 5,056,026 | 10/1991 | Mitchell et al. | 364/431.03 |
| 5,084,821 | 1/1992 | Ohsuga et al. | 364/431.03 X |
| 5,091,858 | 2/1992 | Paielli | 364/431.12 |

FOREIGN PATENT DOCUMENTS 2076188 11/1981 United Kingdom .
8904917 6/1989 World Int. Prop. O. .

Primary Examiner—Parshotam S. Lall
Assistant Examiner—Thomas S. Auchterlonie
Attorney, Agent, or Firm—Daniel L. Dawes

[57] ABSTRACT

The ability of an automotive computer for controlling an engine is enhanced by allowing the automotive computer to be controlled by an arbitrarily selected one of a plurality of engine control programs according to arbitrary driver discretion. The bus connecting the computer and memory of a conventional automotive computer is connected to a computer controlled operator interactive control module and an expanded memory. The operator interactive control module allows a human operator to select one of a plurality of memories for coupling to the automotive computer to control engine performance. User on-site customization of the engine control program is permitted by allowing direct downloading of an engine control program into the automative computer through the oeprator interactive control.

14 Claims, 3 Drawing Sheets

AUTOMOTIVE MULTIPLE MEMORY SELECTOR APPARATUS WITH HUMAN INTERACTIVE CONTROL

This is a continuation of co-pending application Ser. No. 07/579,072 filed on Sep. 6, 1990 now abandoned.

BACKGROUND OF THE INVENTION

1. Field of the Invention

The invention relates to the field of automotive controls and more generally to controls of apparatus of any type which is operated by or must be responsive to human interactive control.

2. Description of the Prior Art

Most automobiles have the engine functions controlled by onboard computer chips. Fuel injection, timing, temperature and RPM are input into an onboard computer which then calculates the desired engine timing according to a prestored fixed program.

Advances in the prior art have been directed to increasing levels of sophistication or intelligence typically manifested by more varied types of engine or vehicle data inputs and use of increasingly sophisticated engine control output programs. For example, Stevenson et al., "Engine Control System", U.S. Pat. No. 4,368,705 (1983), describes an engine control system utilizing a digital microprocessor for controlling the timing mechanism and fuel pump rack limit to set engine timing of and maximum allowable rate of fuel delivery to the engine for maximum engine performance within smoke and emissions as set by EPA levels. Holmes, "Adaptive Control for an Internal Combustion Engine", U.S. Pat. No. 4,893,600 (1990), is directed generally to a digital computer system for establishing values for control parameters which will be continuously varied in accordance with one or more operating input parameters on the engine. Quigley et al., "Engine Control System with Adaptive Air Charge Control", U.S. Pat. No. 4,879,656 (1989), describes another onboard computer system in which the fuel charge and ignition spark timing of the operating engine is controlled as a function of stored tables based on engine speed and air charge. McHale et al., "Adaptive Control System for an Internal Combustion Engine", U.S. Pat. No. 4,841,933 (1989), is also directed to a computer control system in which an engine control parameter is continuously monitored and dynamically directed. Control is implemented in different modes depending upon the speed range. Takasu et al., "Method and Apparatus for Controlling Ignition Timing in a Multicylinder Internal Combustion Engine", U.S. Pat. No. 4,453,521 (1984), describes a system in which a plurality of prestored ignition timing combinations are utilized to continuously search and find an optimum ignition timing combination. Willis et al., "Adaptive Strategy to Control Internal Combustion Engine", U.S. Pat. No. 4,438,497 (1984), discloses a method for adaptively controlling engine calibration control values. A driving pattern is perfected based on analysis of recent past driving patterns and engine control values appropriate for the predicted driving pattern and desired emission constraint are then generated. Driving cycles are analyzed to generate a table of engine calibration control values. Suzuki et al., "Method and Apparatus for Optimum Control for Internal Combustion Engines", U.S. Pat. No. 4,403,584 (1983), discloses a computer system for optimum control of an engine in which values of ignition time and an air/fuel ratio of the engine are prestored in the form of maps in accordance with parameters indicative of operating conditions of the engine. Kamifuji et al., "Engine Control Apparatus and Control Method", U.S. Pat. No. 4,547,852 (1985), describes a method of controlling an engine based upon continuous updating of parameters relating to engine temperature as applied to a prestored control program. Goldenberg et al., "Automotive Regulating Process and Device for Multifuel Internal Combustion Engines", U.S. Pat. No. 4,682,293 (1987), describes an automotive computer system for automatically regulating the running condition of an engine fed with different fuels. The regulator monitors the data processing unit delivering signals representative of the amount and type of fuel being contained in the tank before and after a new fuel supply is provided and controlling the engine correspondingly.

What each of the examples of prior art engine control technology illustrates is that control of the engine and response to some change in the operating characteristics is automatically effectuated through a prestored program or at least through a prestored algorithm which continuously generates control numbers used to modify prestored operating programs, maps or tables. In all cases, the human operator of the vehicle cannot actively intervene to alter engine operating protocol other than through the manipulation of normal controls and then only subject to the constraints provided by the onboard computer.

Therefore, what is needed is some means whereby computer operator control of an engine can be made more responsive to the human operator.

In order to change the operating program in a conventional automotive computer system the battery is disconnected from the vehicle while the transmission is in park, and the engine turned off. The glove compartment is removed to allow access to the automotive computer. The computer module is then dislodged from its mounting and its wiring harness is removed. Typically, a face plate on the computer module must be unscrewed to allow access to an Erasable Programmable Read Only Memory (EPROM) which contains the operating parameters. The EPROM is then removed from the socket and replaced with a new EPROM, there being socket space for only one memory chip. The whole procedure is then reversed to restore the vehicle to an operating condition.

Furthermore, means is required in order to inexpensively and conveniently retrofit prior art computer controlled vehicles to permit greater operator interactive control.

Still further, when retrofitting an automobile with an automotive alarm, it is often necessary to cut or splice into the wiring harness of the automobile in order to disable the automobile upon an alarm condition. Since practical access to the automotive computer is not possible, it cannot be disabled. Therefore, only interruption of the powering harness is available as a means of selective engine disablement.

BRIEF SUMMARY OF THE INVENTION

The invention is an improvement in an apparatus operated by a human operator. The apparatus is controlled at least in part by a computer. The control of the apparatus by the computer is implemented by means of a program stored in a memory. The improvement comprises a plurality of memories. Each of the memories stores a program for controlling operation of the apparatus in a distinguishable mode. An operator interactive control is coupled to the plurality of memories for selectively communicating one of the plurality of memories to the computer in response to arbitrary human operator selection input to the interactive control.

As a result, the apparatus is caused to operate in the selected mode according to the arbitrary decision of the operator.

The operator interactive control comprises a circuit for sensing a plurality of operating conditions. The selected mode causes the apparatus to operate in a distinguishable manner consistent with the sensed operating conditions according to the selected mode.

In one embodiment the operator interactive control also comprises a circuit for selectively operating the apparatus through the computer without selection of one of the plurality of memories.

In another embodiment the operative interactive control comprises a circuit for controlling the apparatus through the computer according to directly entered instructions from the human operator.

The operator interactive control comprises a user computer for generating a plurality of memory enable signals and a manual control switch circuit for allowing manual selection of one of the plurality of memory enable signals. The selected memory enable signal is coupled to the plurality of memories for selecting one of the memories for operation of the apparatus through the computer.

In the illustrated embodiment the apparatus is an engine and the programs stored within the plurality of memories are operating parameters for engine performance. The programs stored within the plurality of memories are operating parameters for engine performance.

The computer for controlling the apparatus comprises a memory and a bus. The bus couples the computer and memory. The plurality of memories and operator interactive control is coupled to the computer through the bus as a retrofitted circuit.

The invention can also be characterized as an improved automotive computer for controlling engine performance comprising a first computer for providing control signals to the engine from a plurality of engine operating parameters. A plurality of memories are coupled to the first computer for providing a plurality of distinguishable programmable modes for operating the engine. An operative interactive control is coupled to the plurality of memories and to the first computer for allowing a human operator to arbitrarily select one of the plurality of memories for coupling to the first computer to control the operation of the engine according to arbitrary human discretion among a plurality of modes corresponding to the plurality of memories. As a result, engine operation is made driver responsive.

The operator interactive control comprises a second computer coupled to the plurality of memories and first computer. The second computer selectively generates a plurality of memory select commands. The operator interactive control further comprises a manual control circuit for allowing the human operator to arbitrarily select one of the memory select commands for coupling to the plurality of memories.

The enhanced automotive computer control system further comprises a plurality of sensors coupled to the second computer for communication to the first computer according to the arbitrarily selected one of the modes corresponding to a selected one of the memories.

One of the sensors is an alarm interface. The alarm interface detects a theft/intrusion attempt. The alarm interface is operatively coupled to the first computer through the second computer without other circuit of connection. The second computer initiates an engine disablement mode upon activation of the alarm interface.

The enhanced automotive computer control system further comprises an input circuit for loading user provided operating parameters into the second computer for communication to the first computer for control of the engine.

The engine is originally provided with the first computer coupled to one of the plurality of memories. The remainder of the plurality of memories and the operative interactive control system are retrofitted by coupling thereto. The remainder of the plurality of memories and the operator interactive control are coupled to the first computer and one of the plurality of memories by a bus. The bus is originally provided with the first computer and one of the plurality of memories. As a result, retrofitting the enhanced automotive computer control system to the originally provided first computer control and the one memory is simplified.

The invention can still further be characterized as an automotive computer control system for an engine to control engine performance. The invention comprises a computer coupled to the engine operative to control the performance of the engine according to an engine control program. A memory is coupled to the computer for storing a plurality of programs. Each of the programs is capable of controlling the operating performance of the engine. An operator interactive control circuit is coupled to the computer and to the memory for allowing selection of one of the programs stored within the memory for control of the engine by the computer. The selection designating the program as the engine control program is determined by arbitrarily exercised discretion of the human operator.

The invention and its various embodiments can better be visualized by now turning to the following drawings wherein like elements are referenced by like numerals.

The invention and its various embodiments can now be understood by turning to the following detailed description.

DETAILED DESCRIPTION OF THE PREFERRED EMBODIMENTS

The ability of an automotive computer for controlling an engine is enhance by allowing the automotive computer to be controlled by an arbitrarily selected one of a plurality of engine control programs according to arbitrary driver discretion. The bus connecting the computer and memory of a conventional automotive computer is connected to a computer controlled operator interactive control module and an expanded memory. The operator interactive control module allows a human operator to select one of a plurality of memories for coupling to the automotive computer to control engine performance. User on-site customization of the engine control program is permitted by allowing direct downloading of an engine control program into the automotive computer through the operator interactive control.

Figure 1:
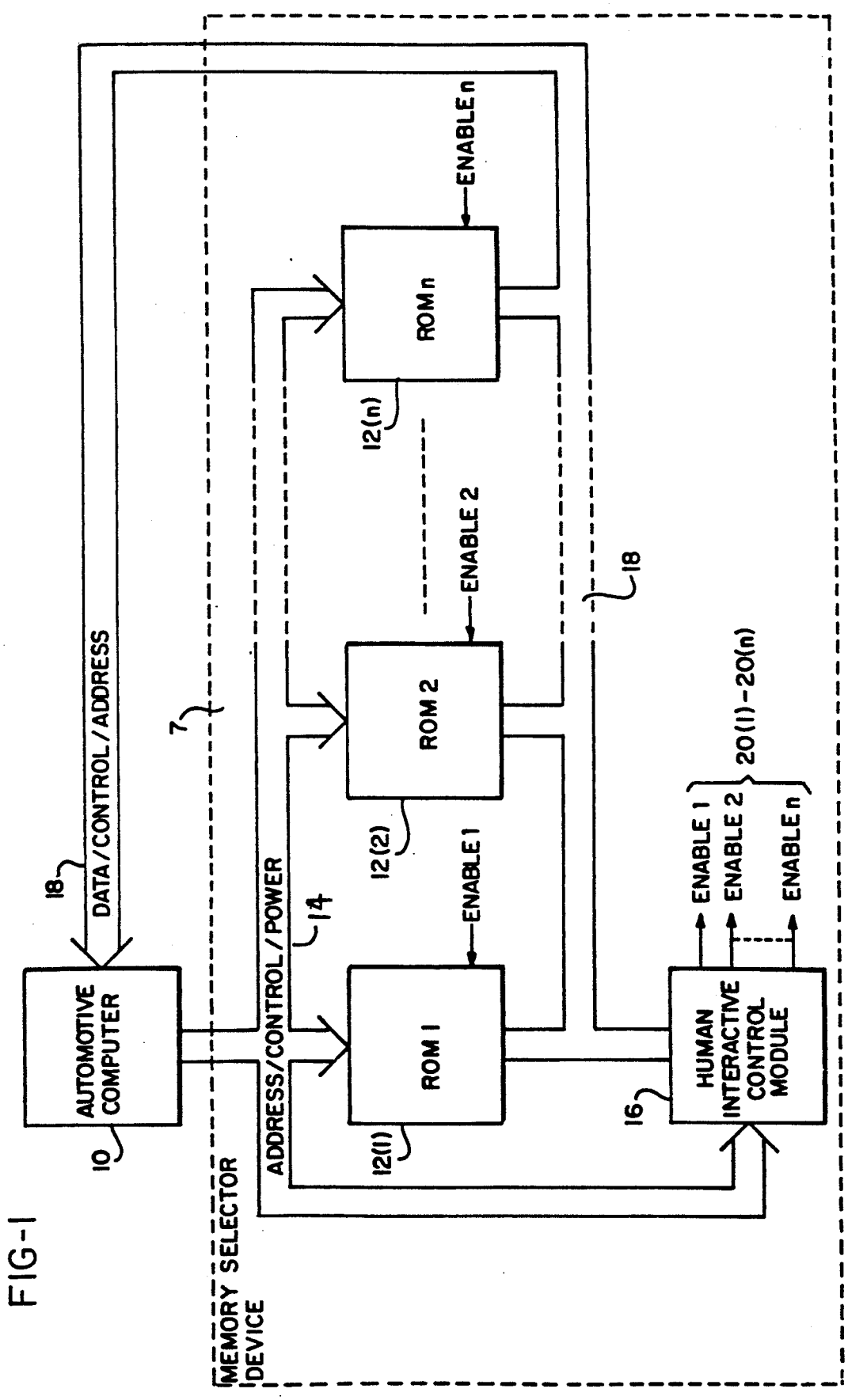
FIG. 1 is a diagrammatic block diagram showing the circuit of the invention coupled to an automotive computer.

FIG. 1 is a block diagram of the invention used in combination with a conventional automotive computer 10. Automotive computer 10 is coupled with a plurality of READ ONLY MEMORIES (ROM) 12(1), 12(2) . . . 12(n) by means of an address and control bus 14. The prestored program to which automotive computer 10 would normally have access would typically be stored within only one ROM 12(1)-12(n). However, according to the teachings of the invention a larger plurality of ROMs 12(1)-12(n) is provided and these are selectively coupled to automotive computer 10 subject to the control of a human interactive control module 16.

Control module 16 is coupled to ROMs 12(1)-12(n) and to automotive computer 10 by a data/control and address bus 18 and is also coupled to address and control bus 14. As will be described below, control module 16 generates a plurality of enable signals 20(1)-20(n) which are distributed to ROMs 12(1)-12(n) and selectively enable one of the ROMs as determined by the human operator.

ROMs 12(1)-12(n) may store a corresponding plurality of sets of operating parameters for automotive computer 10. These operating parameters may include, but are not limited to: a stock configuration which would normally be supplied with the vehicle at the factory; a specially programmed higher economy and lower performance set of operating parameters; a higher performance and lower economy set of operating parameters; a low emissions or prespecified EPA set of operating parameters; a valet parking configuration in which the performance of the vehicle is substantially limited; and a security setting which disables the function of the engine, or even custom operating parameters input by the human operator.

Control module 16 thus allows the human operator to select any one of the sets of operating parameters in ROMs 12(1)-12(n) to be supplied to automotive computer 10 or alternatively to disconnect all of the ROMs and to provide operating parameters directly to automotive computer 10 from control module 16.

Figure 2:
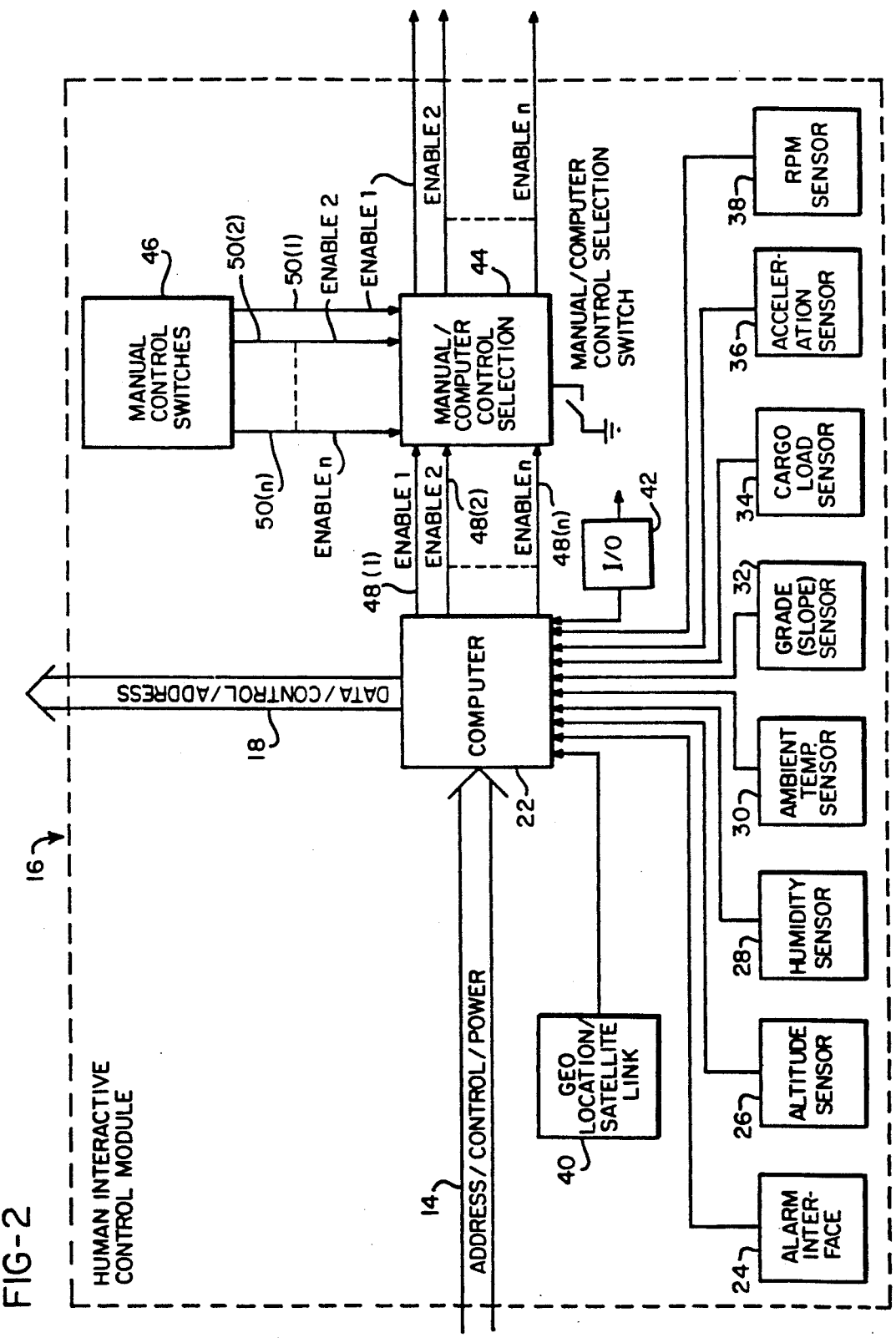
FIG. 2 is a diagrammatic block diagram of the human interactive control module of FIG. 1.

Turn now to the block diagram of FIG. 2 which illustrates one embodiment of the human interactive control module 16 in greater detail. Module 16 includes a computer subsystem 22 coupled to address and control bus 14 and data and control bus 18. Computer subsystem includes a central processing unit and memory. Computer subsystem 22 implements the program described below in connection with FIGS. 3 and 4. Inputs are provided to computer subsystem 22 from a plurality of sensors 24-40. In the illustrated embodiment an alarm interface 24 is provided when intrusion or attempted entry into the vehicle is sensed. In addition to the activation of audio alarm, this causes computer subsystem 22 to send commands to automotive computer 10 to disable all engine functions so that the engine will not run even when hot-wired. This disablement may be permanent until reset by an appropriately entered secret code such as might be input through a keypad or a thumbwheel switch forming part of an input/output device 42.

Another input to computer subsystem 22 includes an altitude sensor 26 for providing information which will adjust timing and fuel mixtures according to octane and oxygen percentages depending upon measured barometric pressures.

Humidity sensor 28 provides computer subsystem 22 with a reading of the local moisture content in air for appropriate adjustment of the ignition timing. Ambient temperature sensor 30 similarly provides the ambient temperature for timing adjustment. Slope sensor 32 provides information to computer subsystem 22 to allow adjustments to be made to engine timing depending upon whether the grade is an up-grade or down-grade and depending upon its degree. Cargo load sensor 34 senses the degree of depression in the suspension system depending upon the load of the vehicle in order to make appropriate operational adjustments. Acceleration sensor 36 measures the actual acceleration to which the automobile is subjected, which acceleration sensing allows for drag, prevailing wind conditions, road friction and other variables which cause actual acceleration to vary from expected acceleration from the engine output. RPM sensor 38 provides the RPM of the engine. A geolocation satellite link 40 through an antenna and navigational system included within link 40 provides locational information to the operator or which can be used in combination with alarm information to provide locational data to a remote theft reporting center to allow tracking of the vehicle in the case that the vehicle is towed or carted while an intrusion alarm has been activated.

Computer subsystem 22 generates a plurality of commands, ENABLE(1)-ENABLE(n) 48(1)-48(n) which are provided to a buffer circuit 44. Buffer circuit 44 is also provided with a plurality of user selected corresponding commands, ENABLE(1)-ENABLE(n) 50(1)-50(n), provided by manual control switches 46. Manual control switches 46 may be thumbwheel switches, a keypad, or a rotary key lock switch which allows the human operator to select from the sets of operating conditions stored in ROMs 12(1)-12(n) by manually positioning switch 46 according to the operator's own wishes and discretion. According to the manual position of switch 46, a control signal 50(1)-50(n) is provided to buffer 44. Another set of control signals 48(1)-48(n) is generated by computer subsystem 22 and provided to buffer 44. The selected control signal 20(1)-20(n) coupled through buffer 44 to ROMs 12(1)-12(n) is chosen from the two sets of control signals 48(1)-48(n) and 50(1)-50(n) by a manual/computer control selection switch 52.

Therefore, the operational condition of the vehicle may be arbitrarily changed according to the operator's discretion and even whim. If the operator is on an uncrowded open highway, he may wish to change the operating conditions of the engine to one which provides optimum fuel economy at constant high speed. If traffic conditions on the same highway are more crowded, the operator may wish to switch on occasion to a mode which provides enhanced power at the cost of fuel efficiency in order, for example, to pass a train of slow moving vehicles. There is nothing in the normal road conditions or operating conditions which can be sensed to automatically switch engine performance according to these types of conditions. These and many other types of conditions are in fact sensed only by the intelligence of the human driver, which is often the most sophisticated intelligence on-board in regard to certain types and levels of decisions relating to engine performance. Only signals such as acceleration, deceleration, cruising, etc. are road or driving conditions which can be used in an automatic or computer controlled mode of operation.

Therefore, what control module 16 allows is human interaction with the operating condition of the engine according to the decision or even the whim of the driver so that the driver's performance, safety and psychological needs as perceived by the driver himself can be filled.

The input/output unit 42 may also include cartridge or digital disk input so that the driver may provide digital input to computer subsystem 22 to provide a custom modification of any one of the sets of operating parameters within ROMs 12(1)-12(n), or to provide a totally new custom set based upon his own analysis of engine operating conditions. Such input devices may include, for example, 3¼" floppy disks, which are uploaded from the driver's home personal computer using other software relating to engine analysis.

Figure 3:
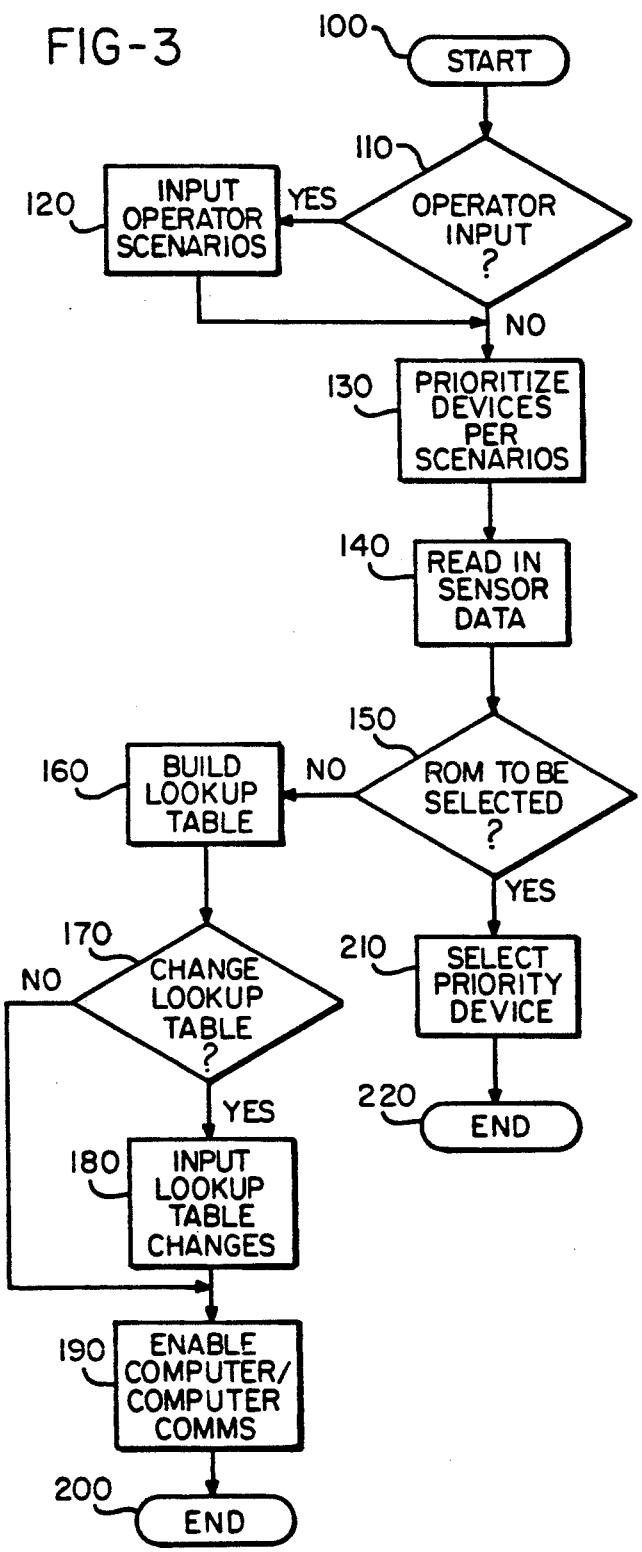
FIG. 3 is a simplified flow diagram illustrating the operation of the invention.

The operation of the circuitry of FIGS. 1 and 2 is described in greater detail in connection with the flow diagrams of FIGS. 3 and 4. In FIG. 3 the methodology begins with step 100 and step 110 wherein operator input is requested. The operator may input various scenarios at step 120 either by positioning manual control switches 46 or by providing an input through input/output module 42. In either case, the operation continues with step 130 wherein various portions of the circuitry of FIGS. 1 and 2 are prioritized or initialized, such as registers and scratch memories, according to the selected scenario. Any one or more of sensors 24-40 are then read and formatted at step 140. At step 150 the decision is made whether or not the operating conditions will be selected from one of the ROMs 12(1)-12(n) or whether the operating parameters will be provided on bus 18 to automative computer 10 directly from computer subsystem 22. If a ROM 12(1)-12(n) is to be selected, then the appropriate ROM 12(1)-12(n) is selected at step 210 according to the scenario previously identified by the driver. The methodology is then completed at step 220.

However, if operating conditions are to be provided to computer 10 directly from computer subsystem 22 a lookup table similar to that contained within one of the ROMs is created at step 160 within memory included within computer 22. If the operator wishes to change or customize the data contained within the lookup table, modification of the lookup table is implemented at step 180, otherwise the process continues with step 190. Computer 22 of module 16 then communicates the result of the modified or unmodified table to automotive computer 10 at step 190 and the process terminates with step 200.

Figure 4:
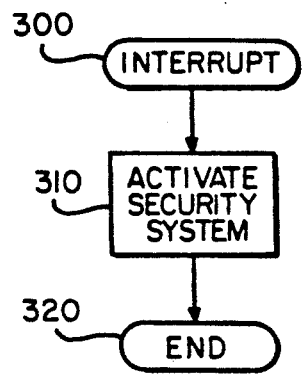
FIG. 4 is a simplified flow diagram illustrating the operation of the security program of the invention.

If at any time activation of the alarm interface 24 occurs, an interrupt is generated as shown in FIG. 4 to cause a security response to be taken at step 310. This security response could include disabling the engine and/or transmitting data from satellite link 40 to a remote police or security tracking station. Execution of a security interrupt subprogram ends at step 320 with return to normal processing.

Many alterations and modifications may be made by those having ordinary skill in the art without departing from the spirit and scope of the invention. Therefore, it must be understood that the illustrated embodiment has been set forth only for the purposes of example and should not be taken as limiting the invention as defined in the following claims. The claims are to be construed not only to include equivalent means for performing substantially the same function in substantially the same way to obtain substantially the same result, but to include all means for obtaining the same result even by different functions or ways. For example, it is expressly within the scope of the invention that instead of a plurality of ROMs 12(l)-12(n), what will be provided or selected by the driver will be an address location in a single larger ROM in which a plurality of sets of operating parameters have been stored. Therefore, instead of a buffer 44 providing an ENABLE control signal 20(l)-20(n) computer 22 will provide a starting address as determined by manual control switches 46 to read a program stored in a single memory.

We claim:

1. An improvement in a vehicle having a predetermined combination of operational elements for controlling vehicular operation according to at least one originally provided program, said predetermined combination of operational elements being defined in a fixed system having a bus, said elements of said system design controlled by an electronic control unit according to said originally provided program said improvement comprising:

a universal module coupled to said bus for arbitrarily reconfiguring programmed control of said electronic control unit regardless of the type of design of said system in which said electronic control unit is employed, said universal module for permitting arbitrary selection among a plurality of additional operational protocols not originally included within said fixed system design, said universal module comprising:

a plurality of preprogrammed memories, each of said memories for storing at least one additional program for use in controlling operation of said vehicle in a distinguishable protocol in addition to those provided by said originally provided program and in lieu of control provided by said originally provided program; and an interactive control, said interactive control being coupled to said plurality of preprogrammed memories only for selectively communicating one of said plurality of preprogrammed memories to said electronic control unit, operation of said vehicle being changed by said interactive control while said vehicle is in transit and being controlled according to said additional program in said selected preprogrammed memory in lieu of said originally provided program, whereby said vehicle is caused to operate in a selected protocol according to the arbitrary driver decision from among a plurality of alternatives available in said plurality of preprogrammed memories.

2. The improvement of claim 1 wherein said interactive control comprises means for sensing a plurality of operating conditions, said selected protocol causing said vehicle to operate in a manner consistent with said sensed operating conditions according to said selected protocol.

3. The improvement of claim 1 wherein said operator interactive control comprises means for selectively operating said vehicle without selection of one of said plurality of memories.

4. The improvement of claim 1 wherein said operative interactive control comprises means for controlling said vehicle according to directly entered instructions.

5. The improvement of claim 4 wherein said vehicle includes an engine and wherein said programs stored within said plurality of memories are operating parameters for engine performance.

6. The improvement of claim 1 wherein said operator interactive control comprises a user computer for generating a plurality of memory enable signals and a manual control switch means for allowing manual selection of one of said plurality of memory enable signals, said selected memory enable signal being coupled to said plurality of memories for selecting one of said memories for operation of said vehicle.

7. The improvement of claim 1 wherein said vehicle includes an engine and wherein said programs stored within said plurality of memories are operating parameters for engine performance.

8. The improvement of claim 1 wherein said operator interactive control comprises a user computer for generating a plurality of memory enable signals and a manual control switch means for allowing manual selection of one of said plurality of memory enable signals, said selected memory enable signal being coupled to said plurality of memories for selecting one of said memories for operation of said vehicle.

9. An improved automotive computer for controlling engine performance comprising:
   a first computer for providing control signals to said engine, said control signals comprising engine operating parameters;
   a plurality of memories coupled to said first computer for providing a plurality of originally provided programmed modes for operating said engine; and
   wherein said first computer and plurality of memories are combined to provide a fixed system of control to said engine, said fixed system having a bus coupling said first computer and plurality of memories and having an originally provided fixed selection of programmed modes for operating said engine;
   an user-controlled, interactive control coupled to said bus to arbitrarily select one of an additional plurality of programmed modes from said plurality of memories for operating said engine, said selected one of said additional plurality of programmed modes not being originally included in said plurality of memories, said memory having said additional programmed modes being coupled to said first computer to control the operation of said engine during actual transit according to arbitrary human selection among said plurality of programmed modes corresponding to said plurality of memories,
   whereby engine operation is made driver responsive.

10. The improved automotive computer control system of claim 9 wherein said interactive control comprises a second computer coupled to said plurality of memories and first computer, said second computer for selectively generating a plurality of memory select commands, said interactive control further comprising a manual control means for allowing said human operator to arbitrarily select one of said memory select commands for coupling to said plurality of memories.

11. The improved automotive computer control system of claim 10 further comprising a plurality of sensors coupled to said second computer for communication to said first computer according to said arbitrarily selected one of said modes corresponding to a selected one of said memories.

12. The improved automotive computer control system of claim 10 further comprising input means for loading user provided operating parameters into said second computer for communication to said first computer for control of said engine.

13. An automotive computer control system for an engine to control engine performance comprising:
   a computer coupled to said engine operative to control operating performance of said engine;
   a memory coupled to said computer for storing a plurality of originally provided programs, each of said originally provided programs for use in controlling said operating performance of said engine; and
   wherein said computer and memory are combined in a fixed system design with a bus;
   an universal user-controlled, interactive control means coupled to said bus of said fixed system design for allowing arbitrary driver selection of at least one additional program not included as one of said originally provided programs stored within said memory, said selection through said interactive control means designating one of said plurality of originally provided and said at least one additional program for use in controlling said engine during actual transit as may be arbitrarily determined.

14. The automotive computer control system of claim 13 further comprising means for controlling said computer according to a user provided program for said engine control program.

* * * * *